(12) United States Patent
Kim et al.

(10) Patent No.: US 11,961,679 B2
(45) Date of Patent: Apr. 16, 2024

(54) MULTILAYER CAPACITOR WITH CORE-SHELL DIELECTRIC

(71) Applicant: SAMSUNG ELECTRO-MECHANICS CO., LTD., Suwon-si (KR)

(72) Inventors: Jin Woo Kim, Suwon-si (KR); Eun Jung Lee, Suwon-si (KR); Jong Suk Jeong, Suwon-si (KR); Chun Hee Seo, Suwon-si (KR); Jong Hoon Yoo, Suwon-si (KR); Tae Hyung Kim, Suwon-si (KR); Ho Sam Choi, Suwon-si (KR); Sim Chung Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 70 days.

(21) Appl. No.: 17/517,142

(22) Filed: Nov. 2, 2021

(65) Prior Publication Data
US 2022/0139632 A1 May 5, 2022

(30) Foreign Application Priority Data
Nov. 4, 2020 (KR) .................. 10-2020-0146246

(51) Int. Cl.
*H01G 4/30* (2006.01)
*H01G 4/012* (2006.01)
(Continued)

(52) U.S. Cl.
CPC ............. *H01G 4/30* (2013.01); *H01G 4/012* (2013.01); *H01G 4/1218* (2013.01); *H01G 4/224* (2013.01)

(58) Field of Classification Search
CPC ........ H01G 4/30; H01G 4/012; H01G 4/1218; H01G 4/224; H01G 4/1227; H01G 4/06; H01G 4/232; H01G 4/12; C04B 35/4682
See application file for complete search history.

(56) References Cited

U.S. PATENT DOCUMENTS

2013/0194715 A1* 8/2013 Kim .................. H01G 4/30
156/60
2014/0126104 A1* 5/2014 Kim ................ H01G 4/1209
361/301.4
(Continued)

FOREIGN PATENT DOCUMENTS

JP       6592160 B2     10/2019
KR   10-1922876 B1     11/2018

*Primary Examiner* — David M Sinclair
*Assistant Examiner* — Daniel M Dubuisson
(74) *Attorney, Agent, or Firm* — Morgan, Lewis & Bockius LLP

(57) ABSTRACT

A multilayer capacitor includes a body including a plurality of dielectric layers and a plurality of internal electrodes stacked in a first direction, and external electrodes, wherein the body includes an active portion, a side margin portion covering at least one of a first surface and a second surface of the active portion opposing each other in a second direction, and a cover portion covering the active portion in the first direction, respective dielectric layers among the plurality of dielectric layers include a barium titanate-based composition, the dielectric layer of the side margin portion includes Sn, and a content of Sn in the dielectric layer of the side margin portion is different from that of Sn in the dielectric layer of the active portion, and the dielectric layer of the side margin portion includes at least some grains having a core-shell structure.

22 Claims, 3 Drawing Sheets

(51) Int. Cl.
*H01G 4/12* (2006.01)
*H01G 4/224* (2006.01)

(56) References Cited

U.S. PATENT DOCUMENTS

| | | | |
|---|---|---|---|
| 2014/0268492 A1* | 9/2014 | Jeong | C04B 35/4682 |
| | | | 501/137 |
| 2014/0301013 A1* | 10/2014 | Kim | H01G 4/01 |
| | | | 29/25.03 |
| 2017/0169952 A1 | 6/2017 | Kato et al. | |
| 2018/0130601 A1 | 5/2018 | Kim et al. | |
| 2018/0182557 A1* | 6/2018 | Park | H01G 4/1227 |
| 2019/0259536 A1* | 8/2019 | Murosawa | H01G 4/1209 |
| 2020/0411248 A1* | 12/2020 | Hashimoto | H01G 4/008 |
| 2021/0350982 A1* | 11/2021 | Saito | H01G 4/30 |

* cited by examiner

I-I'

MULTILAYER CAPACITOR WITH CORE-SHELL DIELECTRIC

CROSS-REFERENCE TO RELATED APPLICATION(S)

This application claims benefit of priority to Korean Patent Application No. 10-2020-0146246 filed on Nov. 4, 2020 in the Korean Intellectual Property Office, the disclosure of which is incorporated herein by reference in its entirety.

BACKGROUND

1. Field

The present disclosure relates to a multilayer capacitor.

2. Description of Related Art

A capacitor is an element that may store electricity therein, and basically, when a voltage is applied to the capacitor in a state in which two electrodes are disposed to face each other, an electrical charge is accumulated in the respective electrodes. When a direct current (DC) voltage is applied to the capacitor, a current flows in the capacitor while the electrical charge is accumulated in the capacitor, but when the accumulation of the electrical charge is completed, the current does not flow in the capacitor. Meanwhile, when an alternating current (AC) voltage is applied to the capacitor, an AC current flows in the capacitor while polarities of the electrodes are alternated.

Such a capacitor may be divided into several kinds of capacitors such as an aluminum electrolytic capacitor in which electrodes are formed of aluminum and a thin oxide layer is disposed between the electrodes formed of aluminum, a tantalum capacitor in which tantalum is used as an electrode material, a ceramic capacitor in which a dielectric material having a high dielectric constant such as a barium titanate is used between electrodes, a multilayer ceramic capacitor (MLCC) in which ceramic having a high dielectric constant is used in a multilayer structure as a dielectric material provided between electrodes, a film capacitor in which a polystyrene film is used as a dielectric material provided between electrodes, and the like, depending on a type of insulator provided between electrodes.

Thereamong, the multilayer ceramic capacitor has been recently used mainly in fields such as that of a high frequency circuit, since it has excellent temperature characteristics and frequency characteristics and may be implemented to have a small size. Recently, an attempt to implement the multilayer ceramic capacitor in a smaller size has been continuously conducted. To this end, dielectric layers and internal electrodes have been formed to have lower thicknesses.

As a method of miniaturizing the multilayer capacitor and increasing capacitance of the multilayer capacitor, a method of exposing an internal electrode in a width direction of a body to significantly increase an area of the internal electrode in the width direction through a design having no margin, and separately attaching a side margin portion to an electrode exposing surface of such a chip in the width direction in a step after manufacturing the chip and before sintering the chip to complete the chip has been used. However, in such a method, a thickness and an area of the side margin portion are decreased, and a risk of a break and a crack of the side margin portion due to external impacts is thus increased. Therefore, it has been required to apply a dielectric material capable of improving the impact resistance and crack resistance of the side margin portion in a subminiature and high-capacitance multilayer capacitor.

SUMMARY

An aspect of the present disclosure may provide a multilayer capacitor having improved electrical and mechanical characteristics by using a dielectric material having high reliability.

According to an aspect of the present disclosure, a multilayer capacitor may include a body including a plurality of dielectric layers and a plurality of internal electrodes stacked in a first direction with respective dielectric layers among the plurality of dielectric layers interposed therebetween, and external electrodes formed on outer surfaces of the body and connected to the internal electrodes, wherein the body includes an active portion having the plurality of internal electrodes positioned therein to form capacitance, a side margin portion, which is formed by disposing dielectric layers, covering at least one of a first surface and a second surface of the active portion opposing each other in a second direction, and a cover portion, which is formed by disposing dielectric layers, covering the active portion in the first direction, wherein each of the dielectric layers includes a barium titanate-based composition, the dielectric layers of the side margin portion include Tin(Sn), and a content of Sn in the dielectric layer of the side margin portion is different from that of Sn in the dielectric layer of the active portion, and the dielectric layer of the side margin portion includes at least some grains having a core-shell structure. Additionally, a content of Sn in the dielectric layer of the cover portion may be different from that of Sn in the dielectric layer of the side margin portion with respect to 100 mol % of the barium titanate-based composition, and the dielectric layer of the cover portion may include at least some grains having a core-shell structure.

In the core-shell structure, a content of Sn in a shell portion may be higher than that of Sn in a core.

A shell portion of the core-shell structure may include the barium titanate-based composition in which Ti may be substituted with Sn.

The content of Sn included in the dielectric layer of the side margin portion may be higher than that of Sn included in the dielectric layer of the active portion.

A shell portion of the core-shell structure may cover 30% or more of an outer surface area of a core of the core-shell structure.

In the dielectric layer of the side margin portion, the grains in which a shell portion of the core-shell structure covers 30% or more of an outer surface area of a core of the core-shell structure may be 10% or more of total grains.

The dielectric layers of the side margin portion may contain 0.1 to 10 mol of Sn based on 100 mol of barium titanate.

An average grain size in the dielectric layer of the side margin portion may be smaller than that in the dielectric layer of the active portion.

The dielectric layer of the cover portion may include at least some grains having a core-shell structure, and in the core-shell structure, a content of Sn in a shell portion may be higher than that of Sn in a core.

According to another aspect of the present disclosure, a multilayer capacitor may include a body including a plurality of dielectric layers and a plurality of internal electrodes stacked in a first direction with respective dielectric layers among the plurality of dielectric layers interposed therebetween, and external electrodes formed on outer surfaces of the body and connected to the internal electrodes, wherein the body includes an active portion having the plurality of internal electrodes positioned therein to form capacitance, side margin portions including a plurality of dielectric layers and covering a first surface and a second surface of the active portion opposing each other in a second direction, and cover portions including a plurality of dielectric layers and covering the active portion in the first direction, the dielectric layers include a barium titanate-based composition, the dielectric layer of the cover portion includes Sn, and a content of Sn in the dielectric layer of the cover portion is different from that of Sn in the dielectric layer of the active portion, and the dielectric layer of the cover portion includes at least some grains having a core-shell structure. Additionally, a content of Sn in the dielectric layer of the cover portion may be different from that of Sn in the dielectric layer of the side margin portion with respect to 100 mol % of the barium titanate-based composition.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
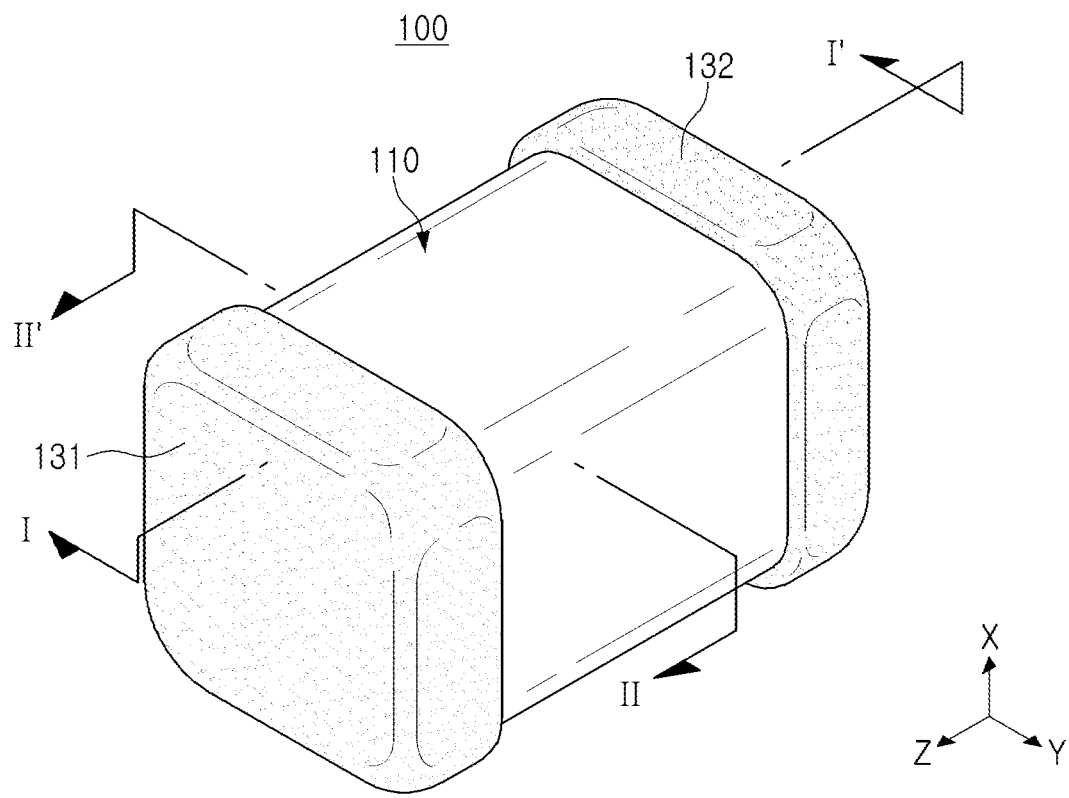
FIG. 1 is a schematic perspective view illustrating an appearance of a multilayer capacitor according to an exemplary embodiment in the present disclosure.
Figure 2:
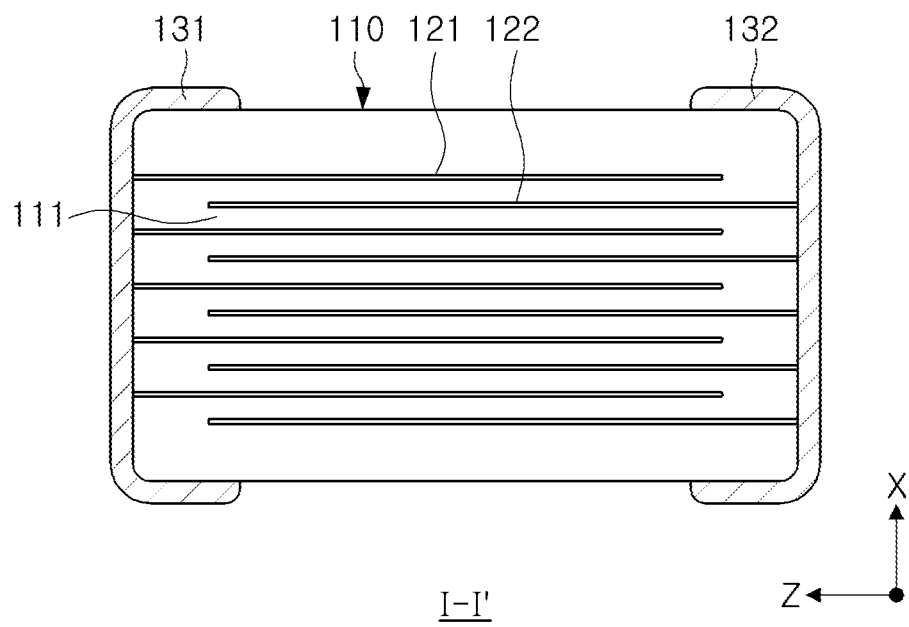
FIG. 2 is a cross-sectional view taken along line I-I' of the multilayer capacitor of FIG. 1.
Figure 3:
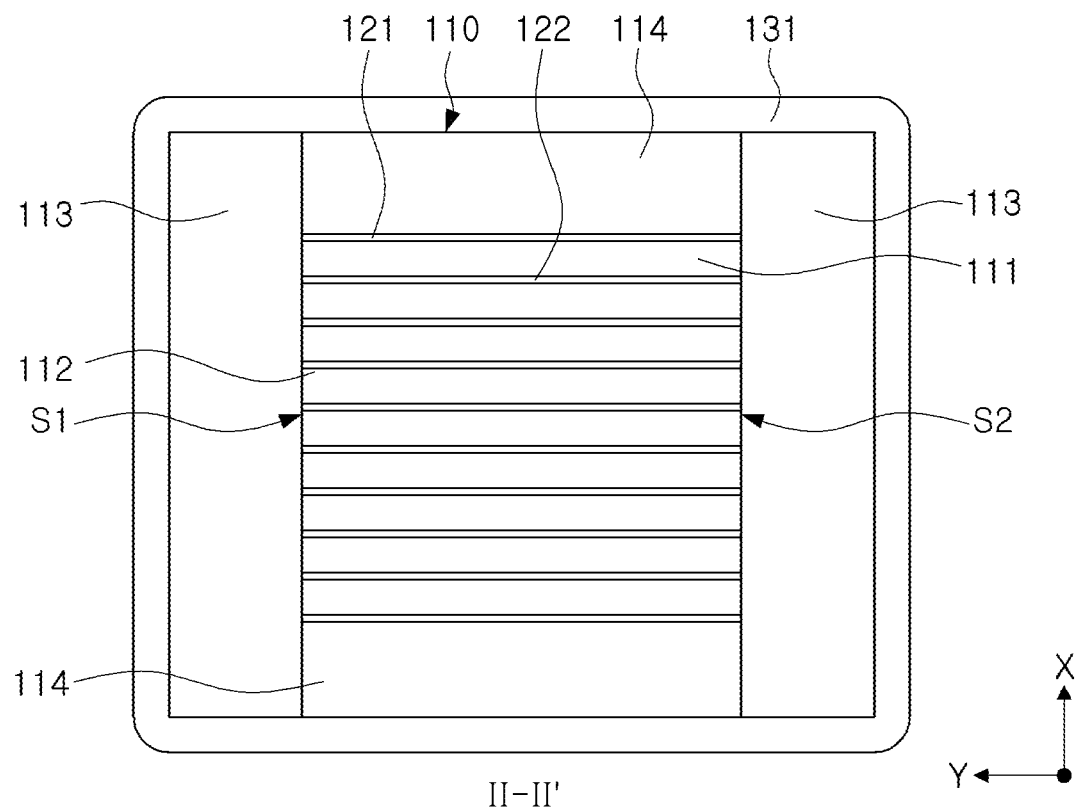
FIG. 3 is a cross-sectional view taken along line II-II' of the multilayer capacitor of FIG. 1.
Figure 4:
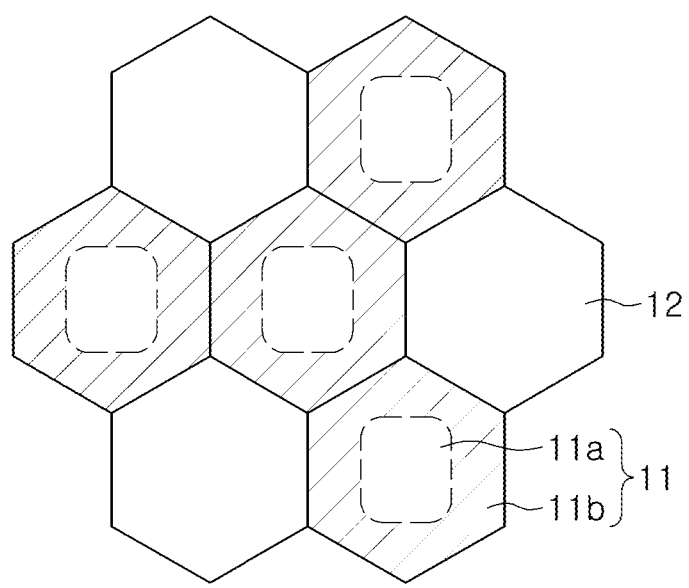
FIG. 4 is a schematic enlarged view of grains of a dielectric layer.
Figure 5:
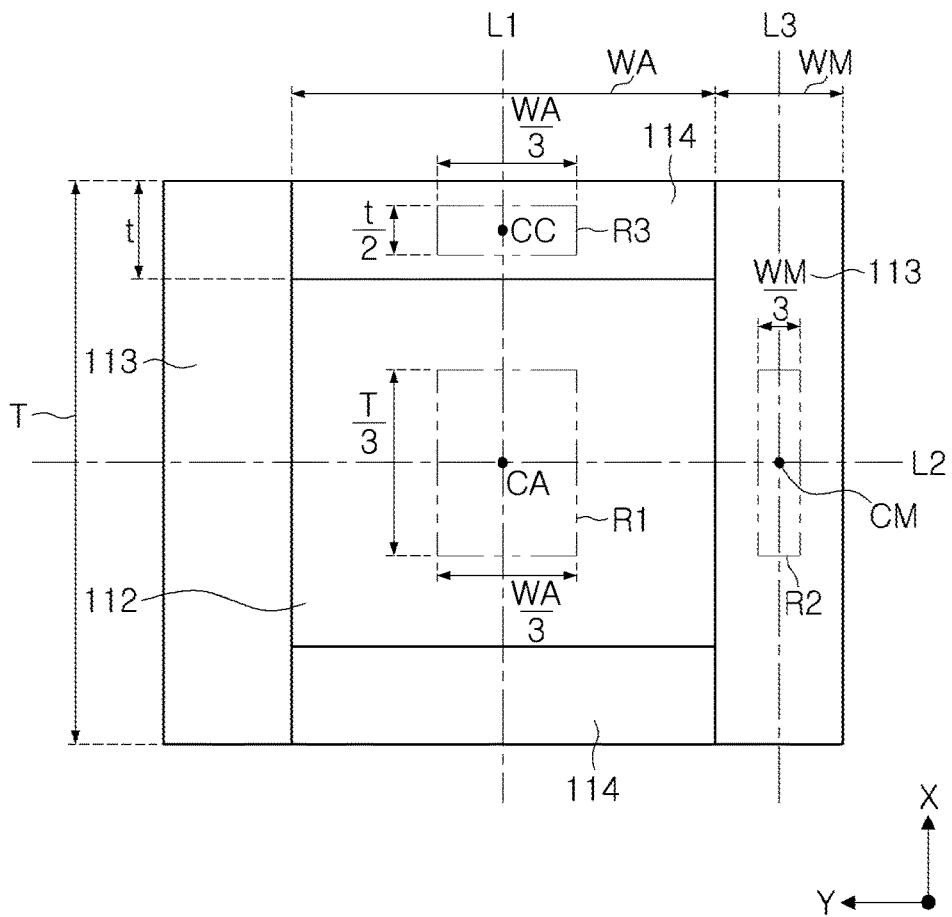
FIG. 5 is a view illustrating a body region of FIG. 3 in a subdivided state.

FIG. 1 is a schematic perspective view illustrating an appearance of a multilayer capacitor according to an exemplary embodiment in the present disclosure. FIG. 2 is a cross-sectional view taken along line I-I' of the multilayer capacitor of FIG. 1. FIG. 3 is a cross-sectional view taken along line II-II' of the multilayer capacitor of FIG. 1. FIG. 4 is a schematic enlarged view of grains of a dielectric layer, and FIG. 5 is a view illustrating a body region of FIG. 3 in a subdivided state.

Referring to FIGS. 1 through 3, a multilayer capacitor 100 according to an exemplary embodiment in the present disclosure may include a body 110 including dielectric layers 111 and a plurality of internal electrodes 121 and 122 stacked in a first direction (an X direction) with respective dielectric layers 111 interposed therebetween, and external electrodes 131 and 132, wherein the body 110 includes an active portion 112 including a plurality of dielectric layers and a plurality of internal electrodes stacked with the dielectric layers interposed therebetween, a side margin portion 113 including a plurality of dielectric layers, and a cover portion 114 a plurality of dielectric layers. Here, the dielectric layer 111 of the side margin portion 113 may include Sn, and a content of Sn in the dielectric layer 111 of the side margin portion 113 may be different from that of Sn in the dielectric layer 111 of the active portion 112. In addition, the dielectric layer 111 of the side margin portion 113 may include at least some grains having a core-shell structure. Additionally, a content of Sn in the dielectric layer of the side margin portion may be different from that of Sn in the dielectric layer of the cover portion with respect to 100 mol % of the barium titanate-based composition. The term content disclosed in the present specification may be a molar content of an element with respect to 100 mol % of the barium titanate-based composition.

The body 110 may have a stacked structure in which a plurality of dielectric layers 111 are stacked in the first direction (the X direction), and may be obtained by stacking and then sintering, for example, a plurality of ceramic green sheets. The plurality of dielectric layers 111 may have a form in which they are integrated with each other by such a sintering process. The body 110 may have a shape similar to a rectangular parallelepiped shape, as illustrated in FIG. 1. The dielectric layer 111 included in the body 110 may include a ceramic material having a high dielectric constant, and may include a barium titanate ($BaTiO_3$)-based composition. Specifically, the dielectric layer 111 may include a base material main component including Ba and Ti. Here, the base material main component may include $BaTiO_3$ or a main component represented by $(Ba,Ca)(Ti,Ca)O_3$, $(Ba,Ca)(Ti,Zr)O_3$, $Ba(Ti,Zr)O_3$, or $(Ba,Ca)(Ti,Sn)O_3$ in which Ca, Zr, Sn, or the like, is partially solid-dissolved. In addition, the dielectric layer 111 may further include additives, organic solvents, plasticizers, binders, dispersants, and the like, if necessary, together with the ceramic material, which is a main component. Here, the additives may include a metal component, and may be added in a metal oxide form in a manufacturing process. An example of such metal oxide additives may include at least one of $MnO_2$, $Dy_2O_3$, BaO, MgO, $Al_2O_3$, $SiO_2$, $Cr_2O_3$, and $CaCO_3$.

Each of the plurality of internal electrodes 121 and 122 may be formed by printing and then sintering a paste including a conductive metal at a predetermined thickness on one surface of the ceramic green sheet. In this case, the plurality of internal electrodes 121 and 122 may include first and second internal electrodes 121 and 122 exposed to surfaces of the body 110 opposing each other in a third direction (a Z direction), respectively, as illustrated in FIG. 2. Here, the third direction (the Z direction) may be a direction perpendicular to the first direction (the X direction) and a second direction (a Y direction). Here, the second direction (the Y direction) refers to a direction in which a first surface S1 and a second surface S2 of the active portion 112 of the body 110 oppose each other. In this case, the first and second internal electrodes 121 and 122 may be connected to different external electrodes 131 and 132, respectively, to have different polarities when the multilayer capacitor is driven, and may be electrically separated from each other by respective dielectric layers 111 disposed therebetween. However, according to another exemplary embodiment, the number of external electrodes 131 and 132 and a connection manner between the external electrodes 131 and 132 and the internal electrodes 121 and 122 may be changed. Examples of a main material constituting the internal electrodes 121 and 122 may include nickel (Ni), copper (Cu), palladium (Pd), silver (Ag), or the like, or alloys thereof.

The external electrodes 131 and 132 may include first and second external electrodes 131 and 132 formed on outer surfaces of the body 110 and connected, respectively, to the first and second internal electrodes 121 and 122. The external electrodes 131 and 132 may be formed by a method of preparing a material including a conductive metal in a form of a paste and then applying the paste to the body 110, and examples of the conductive metal may include nickel (Ni), copper (Cu), palladium (Pd), gold (Au), or alloys thereof. The external electrodes 131 and 132 may further include plating layers including Ni, Sn or the like.

Referring to FIG. 3, the active portion 112 may have the plurality of internal electrodes 121 and 122 positioned therein to form capacitance. The side margin portion 113 may cover at least one of the first surface S1 and the second surface S2 of the active portion 112 opposing each other in the second direction (the Y direction), and in the present exemplary embodiment, it has been illustrated that the side margin portions 113 cover both of the first surface S1 and the second surface S2 of the active portion 112. In this case, the second direction (the Y direction) may be perpendicular to the first direction (the X direction). The cover portion 114 may cover the active portion 112 in the first direction (the X direction), and in the present exemplary embodiment, the cover portions 114 may be disposed on both of upper and lower surfaces of the active portion 112 in the first direction (the X direction).

In the present exemplary embodiment, moisture resistance characteristics, toughness and the like have been improved by adjusting a component, a grain size and the like of the dielectric layer 111 in the side margin portion 113 that has a great influence on reliability of the multilayer capacitor 100. The following description will be provided on the basis of the side margin portion 113, but the dielectric layer 111 having excellent reliability may be applied to the cover portion 114 or may be applied to both of the side margin portion 113 and the cover portion 114 to significantly increase characteristic improvement.

In the present exemplary embodiment, the dielectric layer 111 of the active portion 112 and the dielectric layer 111 of the side margin portion 113 may include Sn, but a content of Sn in the dielectric layer 111 of the active portion 112 and a content of Sn in the dielectric layer 111 of the side margin portion 113 may be different from each other. According to research of the present inventors, it has been confirmed that grain growth characteristics, toughness and the like are changed according to the content of Sn in the dielectric layer 111 including a barium titanate composition and electrical characteristics, mechanical characteristics and the like are improved by making contents of Sn for each region constituting the body 110 different from each other. As an example, the content of Sn included in the dielectric layer 111 of the side margin portion 113 may be higher than that of Sn included in the dielectric layer 111 of the active portion 112. Therefore, moisture resistance characteristics, toughness and the like of the body 110 may be improved.

The dielectric layer 111 of the side margin portion 113 may include Sn in order to improve moisture resistance reliability and have impact resistance and crack resistance, and the content of Sn in the dielectric layer 111 of the side margin portion 113 may be adjusted to be higher than that of Sn in the dielectric layer 111 of the active portion 112. In this case, the dielectric layer 111 of the active portion 112 may not include Sn or may include only a very small amount of Sn even though it includes Sn. When the content of Sn included in the dielectric layer 111 of the side margin portion 113 is higher than that of Sn included in the dielectric layer 111 of the active portion 112, grain growth of grains in the dielectric layer 111 of the side margin portion 113 may not be relatively large, such that an average grain size of the grains included in the dielectric layer 111 of the side margin portion 113 may be adjusted to be smaller than an average grain size of grains included in the dielectric layer 111 of the active portion 112. Therefore, the side margin portion 113 may have moisture resistance characteristics and toughness higher than those of the active portion 112. Therefore, when the multilayer capacitor 100 is mounted on a circuit board or the like, a crack in the body 110, particularly, the side margin portion 113 may be suppressed.

The content of Sn may be adjusted in order to express a sufficient level of improved characteristics in the side margin portion 113. In this case, the dielectric layers 111 of the side margin portion 113 may contain 0.1 to 10 mol of Sn based on 100 mol of barium titanate ($BaTiO_3$). When the content of Sn is less than 0.1 mol based on 100 mol of barium titanate ($BaTiO_3$) included in the dielectric layers of the margin portion, it may be difficult to exhibit a substantial effect by addition of Sn, and when the content of Sn exceeds 10 mol based on 100 mol of barium titanate, impact resistance deterioration may be problematic due to formation of a network between Sn and Sn.

In the present exemplary embodiment, the dielectric layer 111 of the side margin portion 113 may include grains 11 having a core-shell structure as illustrated in FIG. 4. In this case, in the core-shell structure, a content of Sn in a shell portion 11b may be higher than that of Sn in a core 11a, and the shell portion 11b may have a form in which some of Ti therein are substituted with Sn. The shell portion 11b may cover 30% or more of a surface of the core 11a. In addition, the dielectric layer 111 of the side margin portion 113 includes the grains 12 in which the shell portion 11b covers 30% or more of the outer surface area of the core 11a in an amount of 10% or more with respect to a total number of grains 11 and 12 included in the dielectric layer 111 of the side margin portion. In addition, a thickness of the shell portion 11b is not particularly limited, and may be, for example, 2 to 50 nm. The thickness of the shell portion 11b may be measured by a method of using a transmission electron microscope (TEM) and an energy dispersive X-ray spectrometer (EDS) device. In particular, a TEM-EDS line analysis may be performed on a major axis passing through the center of the core-double shell structure of the crystal grain. Then, an intensity for the Sn element is measured, which may be proportional to the concentration of Sn. The boundary between the core and the shell of the crystal grain may be determined by detecting a part in which the concentration of Sn significantly increases.

Sn may be an element that has the same oxidation number as Ti, and Sn has a different ionic radius from Ti, and when some of Ti of the barium titanate ($BaTiO_3$)-based composition in the shell portion 11b are substituted with Sn, a structure having generally a cubic phase may be transformed into a lattice structure and converted into a phase having a dipole moment, such that a dielectric constant of the shell portion 11b itself may be increased to secure a high dielectric constant. In addition, when some of Ti in the shell portion 11b are substituted with Sn, a ratio (Ba/Ti) of Ba to Ti may be increased, such that grain growth of dielectric grains may be suppressed. In this case, the ratio (Ba/Ti) of Ba to Ti may be 1.0150 or more. When the ratio (Ba/Ti) of Ba to Ti is 1.0150 or more, such that Ba has a high molar ratio, grain growth of the dielectric grains at the time of sintering may be suppressed, such that the dielectric grains may be compacted. Therefore, electrical characteristics (breakdown voltage characteristics), moisture resistance reliability and the like may be improved.

As described above, an average grain size of grains G2 (see FIG. 7) included in the dielectric layer 111 of the side margin portion 113 in which the content of Sn is relatively higher than that of Sn in the dielectric layer 111 of the active portion 112 may be smaller than that of grains G1 (see FIG. 6) included in the dielectric layer 111 of the active portion 112. For example, the average grain size of the dielectric layer 111 of the side margin portion 113 may be 100 to 700 nm. Further, the dielectric layer 111 of the active portion 112 may include a composition commonly used in a multilayer ceramic capacitor (MLCC) field, and in this case, an average grain size of the dielectric layer 111 of the active portion 112 may be 300 to 900 nm. In this case, as the content of Sn included in the dielectric layer 111 of the side margin portion 113 increases, the grain size may decrease from an outer boundary surface of the side margin portion 113 toward an inner region adjacent to the active portion 112. That is, Sn in the side margin portion 113 may decrease the grain size of the dielectric grains, and the grain size of the dielectric grains may be further decreased at an inner side of the side margin portion 113 adjacent to the active portion 112, and the side margin portion 113 may thus have high toughness.

Figure 6:
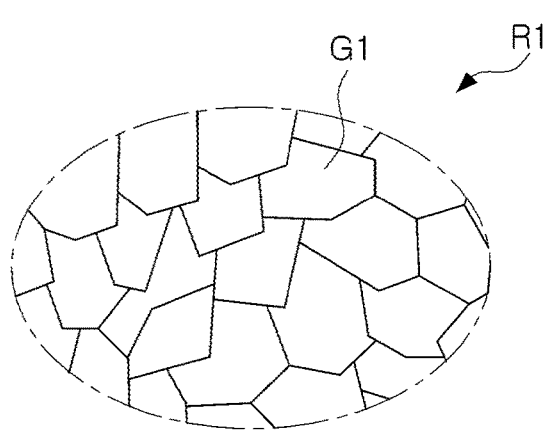
FIG. 6 is a view illustrating a form of dielectric grains of the active portion.
Figure 7:
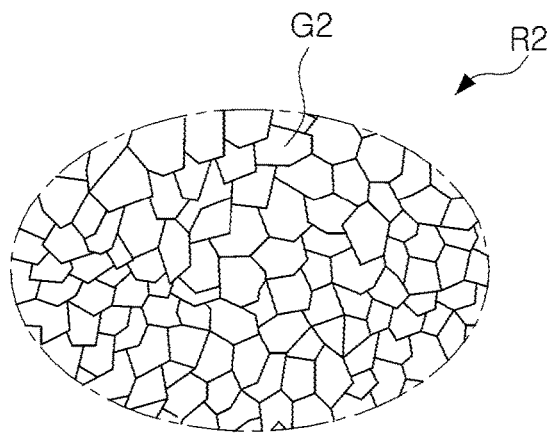
FIG. 7 is a view illustrating a form of dielectric grains of the side margin portion.

The average grain size of the grains included in the dielectric layer 111 may be obtained by a method of calculating circle equivalent diameters of dielectric grains extracted from corresponding regions, a method of measuring major axis lengths and minor axis lengths of the dielectric grains to calculate an average grain size, or the like. Referring to FIGS. 6 and 7 together with FIG. 5, as an example of a method of measuring the grain size, the average grain size of the dielectric layer 111 may be measured on the basis of a cut plane cut in the first direction (the X direction) and the second direction (the Y direction). In this case, a surface cut at the center of the body 110 in a length direction may be used as the third direction (the Z direction).

When a length of the body 110 in the first direction (the X direction) is T and a length of the active portion 112 in the second direction (the Y direction) is WA, the average grain size of the dielectric layer 111 of the active portion 112 may be measured from sizes of the grains G1 existing in a first rectangle R1 in the cut plane of FIG. 5. The first rectangle R1 may include a central region CA of the active portion 112, and have a horizontal length of WA/3 and a vertical length of T/3. In addition, the first rectangle R1 may be symmetrical in relation to center lines L1 and L2 in the first and second directions in the active portion 112. The average grain size in the dielectric layer 111 of the side margin portion 113 may be measured from sizes of the grains G2 existing in a second rectangle R2 including a center region CM. When a length of the side margin portion 113 in the second direction (the Y direction) is WM, the second rectangle R2 may have a horizontal length of WM/3 and a vertical length of T/3, and may be symmetric in relation to center lines L3 and L2 in the first and second directions in the side margin portion 113. In a similar manner, an average grain size in the dielectric layer 111 of the cover portion 114 may be obtained by measuring sizes of grains existing in a third rectangle R3 including a central region CC. Here, grains may have a form as illustrated in FIG. 7. The third rectangle R3 may have a horizontal length of WA/3 and a vertical length of t/2 (here, t is a thickness of the cover portion 114), and may be symmetric in relation to center lines in the first and second directions in the cover portion 114.

As described above, in a case of measuring the sizes of the grains G1 and G2, a method of measuring areas of the grains G1 and G2 and converting the measured areas into circle equivalent diameters, a method of measuring major axis lengths and minor axis lengths of the grains G1 and G2 to calculate average grain sizes, or the like, may be used. In addition, in order to increase accuracy of the measurement, only the grains G1 and G2 of which the entire regions are surrounded by grain boundaries in the reference rectangles R1, R2 and R3 may be selected.

In addition, a description for the dielectric layer 111 of the side margin portion 113 may be applied to the cover portion 114 as it is, and the content characteristics of Sn in the dielectric layer 111 and the core-shell structure of the dielectric layer 111 described above may be applied only to the cover portion 114 rather than the side margin portion 113. Alternatively, the content characteristics of Sn in the dielectric layer 111 and the core-shell structure of the dielectric layer 111 described above may be applied to both of the side margin portion 113 and the cover portion 114.

As set forth above, according to an exemplary embodiment in the present disclosure, electrical and mechanical characteristics of the multilayer capacitor may be improved.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
a body including an active portion including a plurality of dielectric layers and a plurality of internal electrodes stacked in a first direction with respective dielectric layers among the plurality of dielectric layers interposed therebetween; and
external electrodes formed on outer surfaces of the body and connected to the internal electrodes,
wherein the body includes the active portion having the plurality of internal electrodes positioned therein to form capacitance, a side margin portion covering at least one of a first surface and a second surface of the active portion opposing each other in a second direction, and a cover portion covering the active portion in the first direction,
the dielectric layers of the active portion, the side margin portion, and the cover portion include a barium titanate-based composition,
the dielectric layer of the active portion and the side margin portion includes tin (Sn), and a content of Sn in the dielectric layer of the side margin portion is different from that of Sn in the dielectric layer of the active portion with respect to 100 mol % of the barium titanate-based composition,
the dielectric layer of the side margin portion includes a plurality of grains having a core-shell structure, and
wherein a shell portion of the core-shell structure includes a barium titanate-based composition in which Ti is substituted with Sn.

2. The multilayer capacitor of claim 1, wherein in the core-shell structure, a content of Sn in the shell portion is higher than that of Sn in a core.

3. The multilayer capacitor of claim 1, wherein the content of Sn in the dielectric layer of the side margin portion is higher than that of Sn in the dielectric layer of the active portion.

4. The multilayer capacitor of claim 1, wherein the shell portion of the core-shell structure covers 30% or more of an outer surface area of a core of the core-shell structure.

5. The multilayer capacitor of claim 1, wherein the dielectric layer of the side margin portion includes grains in which the shell portion of the core-shell structure covers 30% or more of an outer surface area of a core of the core-shell structure in an amount of 10% or more with respect to a total number of the grains in the dielectric layer.

6. The multilayer capacitor of claim 1, wherein the dielectric layer of the side margin portion contains 0.1 to 10 mol of Sn based on 100 mol of barium titanate ($BaTiO_3$).

7. The multilayer capacitor of claim 1, wherein an average grain size in the dielectric layer of the side margin portion is smaller than an average grain size in the dielectric layer of the active portion.

8. The multilayer capacitor of claim 7, wherein the average grain size of the dielectric layer of the side margin portion is 100 to 700 nm, and the average grain size of the dielectric layer of the active portion is 300 to 900 nm.

9. The multilayer capacitor of claim 1, wherein the dielectric layer of the cover portion includes at least some grains having a core-shell structure, and in the core-shell structure, a content of Sn in the shell portion is higher than that of Sn in a core.

10. The multilayer capacitor of claim 1, wherein the content of Sn in a shell portion is a molar concentration of Sn with respect to 100 mol % of the barium titanate-based composition.

11. A multilayer capacitor comprising:
a body including an active portion including a plurality of dielectric layers and a plurality of internal electrodes stacked in a first direction with respective dielectric layers among the plurality of dielectric layers interposed therebetween; and
external electrodes formed on outer surfaces of the body and connected to the internal electrodes,
wherein the body includes the active portion having the plurality of internal electrodes positioned therein to form capacitance, side margin portions including a plurality of dielectric layers and covering a first surface and a second surface of the active portion opposing each other in a second direction, and cover portions including a plurality of dielectric layers and covering the active portion in the first direction,
the dielectric layers include a barium titanate-based composition,
the dielectric layer of the active portion and the cover portion includes tin (Sn), and a content of Sn in the dielectric layer of the cover portion is different from that of Sn in the dielectric layer of the active portion,
the dielectric layer of the cover portion includes a plurality of grains having a core-shell structure, and
wherein the dielectric layer of the cover portion contains 0.1 to 10 mol of Sn based on 100 mol of barium titanate ($BaTiO_3$).

12. The multilayer capacitor of claim 11, wherein in the core-shell structure, a content of Sn in a shell portion is higher than that of Sn in a core.

13. The multilayer capacitor of claim 11, wherein a shell portion of the core-shell structure includes a barium titanate-based composition in which Ti is substituted with Sn.

14. The multilayer capacitor of claim 11, wherein the content of Sn in the dielectric layer of the cover portion is higher than that of Sn in the dielectric layer of the active portion.

15. The multilayer capacitor of claim 11, wherein a shell portion of the core-shell structure covers 30% or more of an outer surface area of a core of the core-shell structure.

16. The multilayer capacitor of claim 11, wherein the dielectric layer of the cover portion includes grains in which a shell portion covers 30% or more of an outer surface area of a core of the core-shell structure in an amount 10% or more with respect to a total number of the grains in the dielectric layer.

17. The multilayer capacitor of claim 11, wherein an average grain size in the dielectric layer of the cover portion is smaller than an average grain size in the dielectric layer of the active portion.

18. A multilayer capacitor comprising:
a body including an active portion including a plurality of dielectric layers and a plurality of internal electrodes stacked in a first direction with respective dielectric layers among the plurality of dielectric layers interposed therebetween; and
wherein the body includes the active portion having the plurality of internal electrodes positioned therein to form capacitance, a side margin portion including a plurality of dielectric layers and covering at least one of a first surface and a second surface of the active portion opposing each other in a second direction, and a cover portion including a plurality of dielectric layers and covering the active portion in the first direction,
the dielectric layers of the active portion, the side margin portion, and the cover portion include a barium titanate-based composition,
the dielectric layer of the active portion, the cover portion and the side margin portion include tin (Sn), and a content of Sn in the dielectric layer of the cover portion is different from a content of Sn in the dielectric layer of the side margin portion with respect to 100 mol % of the barium titanate-based composition, and
wherein the dielectric layer of the cover portion includes at least some grains having a core-shell structure.

19. The multilayer capacitor of claim 18, wherein a shell portion of the core-shell structure covers 30% or more of an outer surface area of a core the core-shell structure.

20. The multilayer capacitor of claim 18, wherein the dielectric layer of the side margin portion includes at least some grains having a core-shell structure.

21. The multilayer capacitor of claim 20, wherein a shell portion of the core-shell structure covers 30% or more of an outer surface area of a core the core-shell structure.

22. The multilayer capacitor of claim 18, wherein the dielectric layer of the cover portion contains 0.1 to 10 mol of Sn based on 100 mol of barium titanate ($BaTiO_3$).

* * * * *